United States Patent [19]

Rehacek et al.

[11] 4,194,013
[45] Mar. 18, 1980

[54] METHIONINE-CONTAINING MICROGRANULATES AND METHOD OF MANUFACTURE

[75] Inventors: Josef Rehacek; Jaroslav Dasek, both of Yverdon, Switzerland

[73] Assignee: Societe d'Assistance Technique pour Produits Nestle S.A., Lausanne, Switzerland

[21] Appl. No.: 874,630

[22] Filed: Feb. 2, 1978

[30] Foreign Application Priority Data

Feb. 22, 1977 [CH] Switzerland .................... 2165/77

[51] Int. Cl.$^2$ .................... A23J 3/00; A23L 1/34
[52] U.S. Cl. .................... 426/96; 426/305; 426/656; 252/316
[58] Field of Search .................... 426/89, 96, 304, 307, 426/656, 305; 252/316; 424/38

[56] References Cited

U.S. PATENT DOCUMENTS

| 3,711,301 | 1/1973 | Asogawa et al. | 426/96 X |
|---|---|---|---|
| 3,780,195 | 12/1973 | Balassa | 426/96 |
| 3,792,178 | 2/1974 | Noznick | 426/96 |
| 3,803,045 | 4/1974 | Matsukawa et al. | 426/89 X |
| 3,804,776 | 4/1974 | Yazawa et al. | 426/515 X |
| 3,819,838 | 6/1974 | Smith et al. | 426/89 |
| 3,856,699 | 12/1974 | Miyano et al. | 426/89 X |
| 3,903,295 | 9/1975 | Palmer | 426/96 X |
| 3,962,416 | 6/1976 | Katzen | 426/96 X |

*Primary Examiner*—Robert A. Yoncoskie
*Attorney, Agent, or Firm*—Watson, Leavenworth, Kelton & Taggart

[57] ABSTRACT

Microgranulates intended for addition to foods having a deficit in methionine so as to increase their nutritive value are disclosed. They are characterized in that they comprise a core consisting of microcrystals of methionine of at most 10 microns in size encapsulated in a polymer matrix of spheroid shape in which they are evenly distributed, the core being coated in one or more layers of a vegetable protein extracted from gluten, the diameter of the microgranulates obtained being from about 25 to about 200 microns.

15 Claims, No Drawings

METHIONINE-CONTAINING MICROGRANULATES AND METHOD OF MANUFACTURE

The present invention relates to the field of supplementing the amino acids in foods. It concerns, in particular, microgranulates containing methionine and a process for manufacturing them.

Most vegetable proteins have an amino acid composition which does not correspond to the ideal nutritive composition for human or animal foods. In fact, vegetable proteins generally have a deficit in one or other of the essential amino acids. The proteins from leguminous plants, for example, as well as the proteins from yeast do not contain sufficient methionine and the deficit in this amino acid limits the nutritive contribution of these foods because, once the methionine is consumed, the other amino acids provided by the protein are of no use for the growth of the organism since the methionine is the limiting factor of the food.

It has been observed with regard to this matter that the addition of a small quantity of the limiting amino acid to the food allows the nutritive value thereof to be increased considerably. It is therefore worth increasing the nutritive value of foods based on vegetable proteins, in particular leguminous proteins such as soya proteins, but also yeast proteins, corn proteins etc. by supplementing methionine and this allows the imbalance in essential amino acids to be compensated.

This supplementation does however give rise to difficulties. Methionine is soluble in water. Now, foods are frequently treated in water, often in hot water and a large proportion of the methionine added is thus wasted. In addition, methionine has a particularly unpleasant taste making it unsuitable for consumption even if present in a very small quantity. A nauseating odour is released during a thermal treatment. Furthermore, methionine is highly chemically reactive.

Attempts have been made to protect methionine from alteration, to disguise its taste and to reduce its solubility. A first method, described in U.S. Pat. No. 3,804,776, involves encapsulating the amino acid, methionine among others, in an oil or a vegetable or animal fat, by dispersing the amino acid in the melted oil or fat and by spraying this dispersion in a cooled aqueous medium, thus allowing beads of solid fat containing amino acid to be obtained. This process leads to a product having certain disadvantages. The methionine is never completely protected therein; in particular, the fat melts during a thermal treatment, for example when cooked in hot water, and liberates the methionine.

When the capsules enter the digestive system intact, the fat is rapidly consumed and the methionine is liberated more rapidly than the other amino acids forming the protein in the food, and this may lead to an imbalance of assimilation during digestion. Moreover, problems of storage arise because the specific gravity of the beads does not correspond at all to that of the proteins which are to be supplemented and the latter settle in the course of time while the beads of fat rise to the surface. Problems of preservation, such as rancidness, also arise owing to the very nature of the coating material.

For all these reasons, use of these products has been restricted to the supplementing of animal feeds and has never been applied to human nutrition.

Another method is described in Japanese Patent Application No. 20.932/70. It involves protecting the watersoluble amino acid by mixing it with a protein of high molecular weight such as albumin, casein or gelatin, preferably refined, in aqueous solution, by coagulating the mixture obtained, by drying it and by reducing it into the form of granulates. Apart from the fact that a proportion of the amino acid present in the coagulated mass is lost when the coagulated mass is divided, this method does not allow fine particles to be obtained. In addition, although it may be applied to the protection of lysine, it is not suitable for encapsulating methionine. In fact, methionine is not sufficiently soluble to be able to be placed in aqueous solution in an albumin solution. Finally, the organoleptic qualities of the supplemented product leave much to be desired since this method does not allow the taste to be completely disguised and it therefore persists in the food, although weakened.

The microgranulates according to the invention allow all the disadvantages presented by the known products to be obviated.

These microgranulates are characterised in that they comprise a core consisting of microcrystals of methionine of, at most, 10 microns in size, encapsulated in a polymer matrix of spheroid shape in which they are evenly distributed, the core being coated in one or more layers of a vegetable protein extracted from gluten, wherein the diameter of the microgranulates obtained is between 25 and 200 microns.

The microgranulates according to the invention are free-flowing and are therefore easy to manipulate and to store. They may be incorporated easily into dry or moist foods. As their specific gravity is close to that of the foods to be supplemented and their granulometry is homogeneous, there is no sedimentation during storage, even if prolonged. They may be excellently preserved for several years. They are of such a size that they cannot be detected by the palate when mixed with a food. Furthermore, they contain a large quantity of methionine, the taste of which is totally disguised. They resist the thermal treatments to which the foods are usually subjected. They protect the methionine and the solubility thereof is thus greatly reduced, even in hot water. Finally, the methionine is gradually liberated during digestion at the same time as the other amino acids emanating from the proteolysis of the proteins in the food thus imparting to the supplemented food a clearly improved nutritive value.

The invention also relates to a process for manufacturing the microgranulates defined above, characterised by the following stages:

1. The methionine in the form of microcrystals of at most 10 microns in size is suspended in a colloidal aqueous medium, the suspension obtained is dispersed in an oil with vigorous stirring, the mixture is gradually cooled until the aqueous medium gels so as to form micro-beads and, at the same time, the speed of stirring is reduced so as to allow the micro-beads to settle, a proportion of the oily phase is separated, the micro-beads are dehydrated, separated, washed and dried.

2. The micro-beads are placed in a fluidised bed in a hot gaseous stream and a coating solution of a vegetable protein extracted from gluten is sprayed on to the surface of the said micro-beads.

The microcrystals of methionine used in the first stage may be obtained by micro-grinding of crystallised methionine (DL methionine or L methionine) suspended in water in a colloidal mill of the ball mill type. The methionine crystals of from 25 to 150 microns in size (measured using a scanning electron microscope)

are suspended in water. By suitable choice of the proportions of crystallised methionine and water, of the dimension of the balls, the intensity and the duration of the treatment, it is possible to obtain microcrystals not exceeding 10 microns, the majority being from 2 to 5 microns. Cooling prevents the treatment from taking place at a temperature, for example, above 50° C. so as not to solubilize more than about 5% of methionine. Grinding may advantageously take place in any type of vertical or horizontal continuously operating ball mill.

Encapsulation is the first stage of the process. In order to carry out encapsulation, a colloidal aqueous solution of a protein, for example gelatin, is prepared. The viscosity of this solution is regulated and it is advantageously between 120 and 350 cP. This is obtained by maintaining a temperature of from 55° to 70° C. and a polymer concentration of from 30 to 50% by weight. It has proved advantageous to add a plasticizer or filler to the solution in order to improve the shaping of the micro-beads during cooling and to reduce their porosity during subsequent dehydration. In fact, the formation of micro-channels has been observed in the gelatin mass during cooling and particularly during dehydration of the micro-beads. An edible gum, for example gum arabic or whole disintegrated cells of yeast such as, for example, *Candida utilis* are advantageously used as plasticizer or filler.

The ratio by weight of the polymer-water mixture is advantageously from 1:1 to 1:3 and the gum arabic represents from 15 to 50% by weight of the gelatin in the polymer mixture. If yeast proteins are used, they represent from 10 to 50% by weight of the gelatin.

The methionine may be added to the solution prepared in this way in the form of microcrystals obtained by micro-grinding and drying or directly in the form of an aqueous suspension originating from the colloidal mill. In each case, attempts will be made to keep the methionine to aqueous medium ratio by weight as high as possible so as to obtain a high content of methionine of the order of from 40 to 50% in the final product. In practice, this ratio is advantageously from 1:4 to 1:3.

The mixture is then stirred at a temperature of from 55° to 70° C. for about 5 minutes and the preheated oil is slowly introduced at about 60° C. with vigorous stirring. The oil used is preferably a vegetable oil, for example peanut oil, sunflower oil, corn oil, soya oil. It must be present in a large enough quantity to form the continuous phase of the water emulsion in the oil. The aqueous medium (in kg) to oil (in liters) ratio may thus be from 1:5 to 1:0.5. It is preferably about 1:2.

While the oil is being added, for about 5 minutes, the temperature is maintained at about 60° to 70° C. The mixture is then gradually cooled to a temperature of about 10° to 15° C. for 30 to 50 minutes and the stirring speed is simultaneously reduced thus causing the micro-beads of the order of from 20 to 100 microns to gel. The mixture is maintained at the temperature of from 10° to 15° C. for about 25 to 30 minutes and the micro-beads settle. A proportion of the oil, about 50 to 75% by volume of the liquid phase, is removed and may be recycled.

The micro-beads are then dehydrated. For this, an organic solvent which is miscible with water but in which the methionine is not soluble or is sparingly soluble is gradually added. Suitable solvents include ketones, for example acetone, and alcohols such as n-propanol or iropropanol, but acetone is preferred. This introduction takes place at a temperature of from 10° to 20° C. for 20 to 30 minutes. The volume of solvent added is about 4 to 6 times the volume of water to be removed. The methionine crystals are imprisoned in the micro-beads of polymer owing to the slow dehydration and the micro-beads of polymer assume their final shape and size. A reduction in the size of the micro-beads is observed during dehydration and the large diameter corpuscles may shrivel. It is seen that it is worth using maximum starting concentrations of polymer because the lower the concentration of polymer, the greater the quantity of water and, consequently, solubilisation of the methionine crystals during preparation resulting in the necessity of using a greater quantity of solvent for dehydration and the risk of causing the beads to shrivel. However, the viscosity of the aqueous medium poses a restriction since the object is to obtain a high rate of incorporation of methionine in the micro-beads and this is not possible in an aqueous medium which is too viscous. After this operation, the micro-beads are completely separated from the liquid phase by filtration, are washed with the cold solvent to remove the oil and are dried.

The coating of the micro-beads is the second stage of the process. Coating allows a substantial reduction in the solubility as well as better protection of the micro-beads. This operation is advantageously carried out in a fluidised bed, the coating solution being atomised by a very fine nozzle on the surface of the micro-beads which are raised in a uniform movement by a hot gas stream. The coating solution is prepared by dissolving a vegetable protein extracted from gluten in a suitable volatile solvent medium. Zein extracted from corn gluten is preferred as vegetable protein. Zein is a film-forming prolamine which is obtained by alcoholic extraction of the gluten from the grains of corn used in the manufacture of starch. Zein is insoluble in pure alcohols but soluble in aqueous alcoholic mixtures containing from 10 to 40% of water. A 3 to 15% solution of zein in 90% ethanol is preferably used. This solution of zein may also contain a small quantity of additives which are soluble in ethanol such as buffer agents, modifiers, colourants, etc. which improve the stability or the appearance of the layer of coating.

By regulating the residence period of the micro-beads in the coating chamber, it is possible to vary the thickness of the coating layer. Microgranulates of similar dimensions having a range of coating thicknesses may be obtained and these microgranulates will progressively liberate the methionine into the organism after ingestion.

It is certain that microgranulates of above 200 microns in size, for example from 500 to 2000 microns, could be obtained easily by carrying out the process, without departing from the scope of the invention.

The following examples illustrate the invention, in which the proportions given are proportions by weight unless otherwise stated.

EXAMPLE 1

A KDL (WAB) laboratory ball mill functioning continuously and having the following characteristics: 0.6 liter cylinder filled to 80% with 0.5 to 0.75 mm diameter glass beads, agitator with four 64 mm diameter discs, of 10 meters per second circumferential velocity, 0.05 mm distance from the separator, water cooling, is supplied with an aqueous suspension of methionine crystals of from 25 to 150 microns in size in a methionine to water ratio by weight of 3:4.5. The flow-rate of ground suspension is 3 liters per hour and the outlet temperature does not exceed 40° C. Microcrystals are thus obtained and are dried.

1 kg of dry methionine, the corpuscle size of which does not exceed 5 microns, is then introduced into 3.5 kg of aqueous solution of gelatin and gum arabic (0.75 kg of gelatin—pig skin—of the firm Rousselot-Kuhlmann and 0.25 kg of gum arabic in 2.5 kg of water) in a double-walled reactor with agitator regulated to 65° C. After 5 minutes of stirring and of homogenization of the methionine in this polymer, 10 liters of corn oil preheated to 60° C. are slowly added and the mixture is kept at 65° C. with intense stirring until micro-beads of about 60 to 100 microns in size are formed. The mixture is subsequently cooled for 35 minutes to 12° C. and kept at this temperature for 25 minutes until the micro-beads gel and solidify.

Approximately 50% of the liquid phase is removed from this mixture and 7 liters of cold acetone are slowly added (dehydration period 20 to 25 minutes).

After partial dehydration, the micro-beads are completely separated from the liquid phase by filtration, washed with 1.5 liters of cold acetone and dried in the open air.

A solution of zein in 90% alcohol is used for the coating stage. The zein (NBC Cleveland, Ohio) has the following properties:
  molecular weight 25,000-38,000
  specific gravity 1.25 at 25° C.
  purity 98% (2% of xyntophyl isomer and corn oil), ash 0.5% max.
  insoluble in ethanol, propanol, butanol
  soluble in the alcohols in the presence of water in a quantity of 10-40%.

The alcoholic solution of zein (6 to 8% of zein in 90 to 93 ethanol) is sprayed in the form of an aerosol onto the surface of the beads using a Glatt model WSG 15 fluidised bed to a quantity corresponding to 0.3 kg of zein per kg of starting beads, under the following operating conditions:
  turbine—air flow 100 m$^3$/h
  input temperature 40° to 50° C.
  output temperature 24° to 34° C.

Micro-beads of from 30 to 60 microns containing 40% of methionine are thus formed.

EXAMPLE 2

1 kg of ground DL methionine prepared as in Example 1 is introduced into 3 kg of an aqueous mixtures of gelatin and disintegrated yeast regulated to 65° C.

This aqueous mixture of gelatin and yeast is prepared by dissolving 0.85 kg of gelatin—pig skin—in 2 kg of water at 70° C. and adding 0.15 kg of disintegrated *Candida utilis* yeast. The disintegrated *Candida utilis* yeast is obtained by suspending the yeast in a 15% aqueous suspension and subjecting it to the action of a ball mill and then drying the disintegrated yeast obtained.

After homogenising this mixture with methionine for 5 minutes with intense stirring, 10 liters of soya oil are introduced and the suspension is gradually cooled to 45° C. within 5 minutes and then further gradually cooled to 11° C. within 40 minutes. After 30 minutes at this temperature, the beads have solidified.

The speed of stirring is subsequently reduced to the minimum and the micro-beads are left to settle. 50% of the liquid phase is separated, the speed of stirring is increased and 7 liters of cold acetone are slowly added (dehydration period 20 minutes).

The dehydrated beads are left to separate then filtered, washed with 1.5 liters of acetone, dried and coated in the zein as in Example 1. Microgranulates of from 30 to 200 microns in size containing about 38% of methionine are thus obtained.

EXAMPLE 3

The procedure in Example 2 is repeated, except that 1 kg of gelatin, 0.5 kg of disintegrated *Candida utilis* yeast, 2 kg of water and 1 kg of DL methionine are used.

The above-mentioned mixture is granulated at 70° C. in 8 liters of soya oil and dehydrated with 12 liters of acetone. The micro-beads are separated from the oil, washed, dried and coated in the zein as described in Example 1.

EXAMPLE 4

The preparation of the microgranulates according to Example 1 is repeated using 1 kg of L methionine.

EXAMPLE 5

The preparation of the microgranulates is repeated according to Example 1 except that 8 liters of cold isopropanol are used for dehydration (dehydration period 25 minutes). The micro-beads obtained by filtration are washed with 2 liters of cold isopropanol.

EXAMPLES 6–11

By proceeding as described in Example 1, microgranulates of DL methionine having different DL methionine, polymer mixture and zein contents are prepared.

| Examples Content % | 6 | 7 | 8 | 9 | 10 | 11 |
|---|---|---|---|---|---|---|
| DL methionine | 30 | 35 | 36 | 38 | 39 | 40 |
| gelatin-gum arabic 3:1 | 35 | 45 | 41 | 49 | 41 | 41 |
| zein | 31 | 16 | 20 | 10 | 14 | 16 |

EXAMPLE 12

The water-solubility of the microgranulates in Examples 1, 6, 7 and 9 has been studied in relation to the unprotected methionine by treating the samples in water at 20° and 60° C. with vigorous stirring. The following percentages of solubilised product were obtained depending upon the duration of the treatment:

Solubilisation of 1 gram of protected DL methionine in 200 ml of water after 25 minutes expressed in % of the quantity of total methionine

| microgranulate of Example No. | unprotected | 1 | 6 | 7 | 9 |
|---|---|---|---|---|---|
| solubility at 20° C. | 100%* | 25–32 | 10–16 | 20–25 | 25–32 |
| solubility at 60° C. | 100%* | 40–50 | 26–28 | 35–40 | 40–44 |

*in the case of unprotected methionine, total dissolution takes place after 2 minutes.

EXAMPLE 13

A nutritional test was carried out on mice with a feed deficient in methionine and supplemented with protected methionine and unprotected methionine.

The results of the weighing test show that the microencapsulation and coating do not obstruct the liberation of the methionine during digestion.

Thus, male Spargue-Dawley rats of about 5 months, weighing on average 113 g, were fed for 14 days with 10% protein rations (calculated as a percentage of total nitrogen ×6.25) containing casein, *Candida utilis* yeast and isolate of soya proteins, respectively, as the only sources of proteins, then with the same nutriments supplemented with 0.1% of unprotected dl methionine and with 0.25% of microgranulates containing 40% of dl methionine (corresponding to 0.1% of pure dl methionine). Each ration also contained 3% of a mineral mixture (prepared taking into consideration the phosphorus and calcium content of the various sources of proteins and ensuring a correct balance of the calcium, phosphorus and magnesium elements, among others), 1% of a mixture of vitamins, 10% of peanut oil, 5% of potato starch and the complement with 100% of corn starch. The results of weighing, of the quantity of nutriment and of the absorbed proteins, the "protein efficiency ratio" or PER are shown in the table below, as well as the average standard deviation for these values.

| Nutriment | Treatment | Gain in weight (g) | Dose of food (g) | Gain in proteins (g) | PER |
|---|---|---|---|---|---|
| A. | Casein (10% protein) | 31.5 ± 6.6 | 166.8 ± 13.7 | 17.0 ± 1.4 | 1.76 ± 0.22 |
| B. | Casein + 0.10% dl-Meth. | 71.5 ± 2.7 | 222.8 ± 4.6 | 22.9 ± 0.5 | 3.13 ± 0.08 |
| C. | Casein + 0.25% Meth. encapsulated | 72.2 ± 7.0 | 194.5 ± 7.7 | 20.0 ± 0.8 | 3.59 ± 0.25 |
| D. | C. utilis (10% protein) | 4.5 ± 1.4 | 111.1 ± 5.7 | 11.2 ± 0.6 | 0.38 ± 0.11 |
| E. | C. utilis + 0.10% dl-Meth | 44.4 ± 6.0 | 175.4 ± 11.4 | 17.8 ± 1.2 | 2.44 ± 0.19 |
| G. | C. utilis + 0.25% Meth. encapsulated | 36.3 ± 2.0 | 162.5 ± 6.9 | 16.5 ± 0.7 | 2.20 ± 0.06 |
| H. | Soya protein (10% protein) | 11.2 ± 2.9 | 146.0 ± 9.5 | 14.9 ± 1.0 | 0.70 ± 0.17 |
| J. | Soya protein + 0.10% dl-Meth. | 33.7 ± 5.3 | 169.6 ± 8.7 | 17.3 ± 0.9 | 1.91 ± 0.18 |
| K. | Soya protein + 0.25% Meth. encapsulated | 36.2 ± 3.8 | 176.2 ± 6.7 | 18.1 ± 0.7 | 1.98 ± 0.14 |

EXAMPLE 14

Soya flour containing 1.5 g of methionine for 16 g of total nitrogen was supplemented with a quantity of microencapsulated and coated DL methionine corresponding in the final product to 2.6 g of methionine per 16 g of total nitrogen.

*Candida utilis* yeast proteins were supplemented with 0.2% of microencapsulated and coated L methionine.

Organoleptic tests have shown that, in each case, the food supplemented with methionine microgranulates cannot be distinguished from the point of view of taste and smell from a conventional preparation without supplementation and, therefore, that the microgranulates are undetectable to the palate and perfectly neutral.

We claim:

1. Microgranulates intended for addition to foods having a deficit in methionine so as to increase their nutritive value, comprising a core consisting of microcrystals of methionine of at most about 10 microns in size encapsulated in a matrix comprising a gellable water soluble polymer of spheroid shape in which they are evenly distributed, the core being coated in one or more layers of a vegetable protein extracted from gluten, the diameter of the microgranulates obtained being from about 25 to about 200 microns.

2. Microgranulates according to claim 1, wherein the matrix contains gelatin and a plasticiser or filler.

3. Microgranulates according to claim 2, wherein the plasticiser is gum arabic.

4. Microgranulates according to claim 2, wherein the filler comprises yeast proteins.

5. Microgranulates according to claim 1, comprising microcrystals of DL methionine.

6. Microgranulates according to claim 1, comprising microcrystals of L methionine.

7. Microgranulates according to claim 1, comprising up to 50% by weight of methionine.

8. Microgranulates according to claim 1, wherein the vegetable protein forming the coating layer is zein, extracted from corn gluten.

9. A process for manufacturing microgranulates according to claim 1 comprising the following stages:

(1) suspending the methionine in a colloidal aqueous medium comprising a gellable water soluble polymer at a temperature above the gelling point of the resulting colloidal suspension, dispersing the suspension in an oil with intense stirring, cooling the mixture progressively until the aqueous medium gels so as to form micro-beads and reducing the mixing speed at the same time so as to allow the micro-beads to settle, removing a portion of the oil and sequentially dehydrating, separating, washing and drying the micro-beads; and (2) placing the micro-beads in a fluidised bed in a hot gas stream and atomising a coating solution of a vegetable protein extracted from gluten on the surface of the said micro-beads.

10. A process according to claim 9, wherein the microcrystals of methionine are obtained by micro-grinding crystals of about 25 to about 150 microns suspended in water in a colloidal mill of the ball mill type operating continuously and then drying the methionine.

11. A process according to claim 9, wherein a colloidal aqueous solution of polymer having a viscosity of from 120 to 350 centi-poises at a temperature of from 55° to 70° C. is prepared in a polymer:water ratio by weight of from 1:1 to 1:3, the methionine is suspended in the aqueous medium in a methionine:aqueous medium ratio by weight of from 1:4 to 1:3, the mixture is stirred for about 5 minutes, the hot oil is introduced slowly with intense stirring in a sufficient quantity to form a water emulsion in the oil in a ratio of aqueous medium by weight to oil by volume of from 1:5 to 1:0.5, the mixture is cooled gradually with reduction in the stirring speed to a temperature of from 10° to 15° C. for 30 to 50 minutes, the micro-beads are left to settle for about 25 to 30 minutes and from 50 to 75% by volume of oil is removed.

12. A process according to claim 11, wherein the polymer is a mixture by weight of from 15 to 50 parts of gum arabic per 100 parts of gelatin or a mixture by weight of from 10 to 50 parts of yeast proteins per 100 parts of gelatin.

13. A process according to claim 9, wherein the dehydration of the micro-beads is carried out by gradually adding an organic solvent which is miscible with water and in which the methionine is not soluble or is sparingly soluble at from 10° to 20° C. for 20 to 30 minutes in a proportion of from 4 to 6 times the volume of water to be removed.

14. A process according to claim 13, wherein the organic solvent is acetone.

15. A process according to claim 9, wherein the coating solution is a solution of from 5 to 15 parts by weight of zein in 100 parts of aqueous ethanol containing from 10 to 40% by weight of water.

* * * * *